US011642666B2

(12) United States Patent
Walsdorff et al.

(10) Patent No.: US 11,642,666 B2
(45) Date of Patent: *May 9, 2023

(54) SHAPED CATALYST BODY IN THE FORM OF TETRALOBES OF UNIFORM WALL THICKNESS

(71) Applicant: BASF SE, Ludwigshafen am Rhein (DE)

(72) Inventors: Christian Walsdorff, Ludwigshafen am Rhein (DE); Marco Oskar Kennema, Ludwigshafen am Rhein (DE); Marcelo Daniel Kaufman Rechulski, Ludwigshafen am Rhein (DE); Holger Borchert, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 135 days.

This patent is subject to a terminal disclaimer.

(21) Appl. No.: 16/979,131

(22) PCT Filed: Feb. 19, 2019

(86) PCT No.: PCT/EP2019/054073
§ 371 (c)(1),
(2) Date: Sep. 8, 2020

(87) PCT Pub. No.: WO2019/170406
PCT Pub. Date: Sep. 12, 2019

(65) Prior Publication Data
US 2021/0162391 A1    Jun. 3, 2021

(30) Foreign Application Priority Data

Mar. 7, 2018 (EP) .................................... 18160480

(51) Int. Cl.
| | | |
|---|---|---|
| *B01J 35/02* | (2006.01) | |
| *B01J 21/08* | (2006.01) | |
| *B01J 23/22* | (2006.01) | |
| *B01J 27/055* | (2006.01) | |
| *B01J 6/00* | (2006.01) | |
| *B01J 35/04* | (2006.01) | |

(52) U.S. Cl.
CPC ............. *B01J 35/026* (2013.01); *B01J 6/001* (2013.01); *B01J 21/08* (2013.01); *B01J 23/22* (2013.01); *B01J 27/055* (2013.01); *B01J 35/023* (2013.01); *B01J 35/04* (2013.01)

(58) Field of Classification Search
CPC ........ B01J 35/026; B01J 35/023; B01J 35/04; B01J 6/001; B01J 21/08; B01J 23/22; B01J 27/055
See application file for complete search history.

(56) References Cited

U.S. PATENT DOCUMENTS

| | | |
|---|---|---|
| 4,485,190 A | 11/1984 | Sherif |
| 4,539,309 A | 9/1985 | Meissner et al. |
| 5,017,542 A | 5/1991 | Martan et al. |
| 5,034,369 A | 7/1991 | Hebrard et al. |
| 5,082,819 A | 1/1992 | Boeck et al. |
| 5,108,976 A | 4/1992 | Cavalli et al. |
| 5,326,915 A | 7/1994 | Viola et al. |
| 5,330,958 A | 7/1994 | Viola et al. |
| 5,939,351 A | 8/1999 | Rubini et al. |
| 7,799,730 B2* | 9/2010 | Ringer .................... B01J 19/30 502/328 |
| 9,138,729 B2 | 9/2015 | Dobner et al. |
| 10,307,741 B2* | 6/2019 | Grüne ................... B01J 35/026 |
| 2008/0277315 A1 | 11/2008 | Ringer et al. |
| 2009/0306410 A1 | 12/2009 | Brandstädter et al. |
| 2011/0250124 A1 | 10/2011 | Kramer et al. |
| 2015/0343433 A1 | 12/2015 | Dobner et al. |
| 2018/0104674 A1* | 4/2018 | Grüne ................. B01J 37/0018 |

FOREIGN PATENT DOCUMENTS

| | | |
|---|---|---|
| CN | 102688784 A | 9/2012 |
| DE | 68919235 T2 | 3/1995 |
| DE | 69220225 T2 | 2/1998 |
| DE | 69635919 T2 | 9/2006 |
| DE | 69220225 T3 | 10/2006 |
| DE | 102005019596 A1 | 11/2006 |
| EP | 0020963 A2 | 1/1981 |
| EP | 0129903 A2 | 1/1985 |
| EP | 0325213 A1 | 7/1989 |
| EP | 0355664 A1 | 2/1990 |
| EP | 417722 A1 | 3/1991 |
| EP | 464633 A1 | 1/1992 |

(Continued)

OTHER PUBLICATIONS

International Preliminary Examination Report for PCT/EP2019/054073 dated Jul. 8, 2020.

(Continued)

*Primary Examiner* — Yong L Chu
(74) *Attorney, Agent, or Firm* — Faegre Drinker Biddle & Reath LLP (57) ABSTRACT

The invention relates to a shaped catalyst body in the form of a tetralobe having four circular through-passages, with the midpoints of the through-passages forming a square and the spacings between in each case two adjacent through-passages being from 0.8 to 1.2 times the thickness of the outer walls of the through-passages. The shaped catalyst body is used for the oxidation of S02 to S03.

9 Claims, 4 Drawing Sheets

(56) References Cited

FOREIGN PATENT DOCUMENTS

| EP | 0591572 A1 | 4/1994 |
|---|---|---|
| EP | 0732146 A1 | 9/1996 |
| EP | 1386664 A1 | 2/2004 |
| RU | 2003122272 A | 2/2005 |
| WO | WO-2010029324 A1 | 3/2010 |
| WO | WO-2010072723 A2 | 7/2010 |
| WO | WO-2016156042 A1 | 10/2016 |
| WO | WO-2019170514 | 9/2019 |

OTHER PUBLICATIONS

International Preliminary Examination Report for PCT/EP2019/054993 dated Jul. 8, 2020.
International Search Report for PCT/EP2019/054073 dated May 29, 2019.
International Search Report for PCT/EP2019/054993 dated May 31, 2019.
Written Opinion of the International Searching Authority for PCT/EP2019/054073 dated May 29, 2019.
Written Opinion of the International Searching Authority for PCT/EP2019/054993 dated May 31, 2019.
H. Muller: "Sulfuric Acid and Sulfur Trioxide in Ullmann's Encyclopedia of Industrial Chemistry", 2012, Wiley-VCH, DOI: 10.1002/14356007.a25_635.
Villadsen et al., "Supported Liquid-Phase Catalysts", Catal. Rev.—Sci. Eng., vol. 17(2), 1978, pp. 203-272.

* cited by examiner

SHAPED CATALYST BODY IN THE FORM OF TETRALOBES OF UNIFORM WALL THICKNESS

CROSS-REFERENCE TO RELATED APPLICATIONS

This application is a national stage application (under 35 U.S.C. § 371) of PCT/EP2019/054073, filed Feb. 19, 2019, which claims benefit of European Application No. 18160480.2, filed Mar. 7, 2018, both of which are incorporated herein by reference in their entirety.

The invention relates to shaped catalyst bodies having a new body geometry.

The shaped catalyst bodies can comprise, for example, metal aluminates, diatomaceous earth, silicon dioxide, titanium dioxide, zirconium dioxide or mixtures thereof as support materials. They can comprise one or more metals selected from the group consisting of Na, K, Rb, Cs, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, Bi and Ce as active material. The shaped catalyst bodies can be produced by extrusion of a catalyst precursor material which already comprises the active material or by extrusion of the support material and subsequent impregnation of the support with the active material.

The shaped catalyst bodies can, for example, be used in processes for the oxidation of $SO_2$ to $SO_3$, for synthesis gas reactions, for partial oxidations or in processes for preparing ethylene oxide. The invention also relates to a process for the oxidation of $SO_2$ to $SO_3$ using the shaped catalyst bodies.

Modern-day commercial catalysts for the oxidation of $SO_2$ to $SO_3$ usually comprise not only vanadium but also alkali metal compounds, especially potassium compounds but optionally also sodium compounds and/or cesium compounds, and also sulfate. As supports for the abovementioned components, porous oxides, in particular silicon dioxide, $SiO_2$, are usually used. Under reaction conditions, an alkali metal pyrosulfate melt in which the active component vanadium is dissolved in the form of oxo-sulfate complexes is formed on the support material (Catal. Rev.—Sci. Eng., 1978, vol. 17(2), pages 203 to 272). This is referred to as a supported liquid phase catalyst.

The contents of vanadium, calculated as $V_2O_5$, are usually in the range from 3 to 10% by weight, the contents of alkali metals (M), calculated as $M_2O$, are from 5 to 30% by weight, with the molar ratio of alkali metal to vanadium (MN ratio) usually being in the range from 2 to 6. The content of potassium, calculated as $K_2O$, is usually in the range from 6 to 15% by weight and that of sulfate is in the range from 12 to 30% by weight. In addition, the use of numerous further additional elements, for example chromium, iron, aluminum, phosphorus, manganese and boron, has been reported. $SiO_2$ is predominantly used as porous support material.

The production of such catalysts on an industrial scale is usually carried out by mixing of aqueous solutions or suspensions of the various active components, for example appropriate vanadium compounds ($V_2O_5$, ammonium polyvanadate, ammonium metavanadate, alkali metal vanadates or vanadyl sulfates) with alkali metal salts (nitrates, carbonates, oxides, hydroxides, sulfates), sometimes together with sulfuric acid and other components which can function as pore formers or lubricants, for example sulfur, starch or graphite, with the support material. The composition resulting therefrom is processed to form the desired shaped bodies in the next step and finally treated thermally (drying and calcination).

U.S. Pat. No. 4,485,190 describes the production of a catalyst for the oxidation of $SO_2$ to $SO_3$, which comprises V, K and a silicon oxide compound. As shaped bodies, mention is made in column 2, lines 30 ff. and column 5, lines 62 ff. of, inter alia, trilobes. In column 6, lines 5 ff., it is said that trilobes have an 18% greater surface area without further information on the size of the shaped bodies being compared with one another being given. The shape of the trilobes mentioned is not described in more detail. Trilobes having through-passages are not mentioned. In the examples, no trilobes are produced.

DE 689 19 235 T2 describes a catalyst for the oxidation of $SO_2$ to $SO_3$, which comprises vanadium, potassium and a silicon oxide compound. On page 2, lines 2 ff., hollow or compact cylinders, multiply lobed cylinders, optionally with spiral depressions, are proposed as shaped bodies. Other shapes are not described.

EP 464 633 A1 describes a support for a catalyst for producing unsaturated esters. In FIGS. 4 and 5, trilobes having three through-passages are disclosed as possible supports and shaped bodies having more than three through-passages are disclosed in FIGS. 6 and 7. In the examples, only shaped bodies having one hole are described.

EP 0 129 903 A2 discloses the production of a catalyst for the oxidation of sulfur dioxide to sulfur trioxide comprising vanadium and an alkaline metal on a silicate support. According to Example 3, a catalyst is produced in the form of hollow rods having an external diameter of 10 mm and an internal diameter of 5 mm.

EP 0 020 963 A2 discloses a catalyst for the oxidation of sulfur dioxide to sulfur trioxide comprising vanadium compounds and alkaline metal compounds on a silicate support in the form of extrudates having a star-shaped cross section having from 4 to 6 points.

EP 0 732 146 A1 discloses shaped catalyst bodies for the oxidation of methanol to formaldehyde in the form of trilobes having three through-passages.

U.S. Pat. No. 5,330,958 A describes catalysts in the form of trilobes having three through-passages, a low pressure drop and a high surface area-to-volume ratio.

EP 0 355 664 relates to a catalyst for the oxidation and ammonoxidation of alpha-, beta-unsaturated hydrocarbons in the form of a from 3- to 5-spoked wheel or a rosette.

WO 2010/072723 A2 discloses a shaped catalyst body for preparing maleic anhydride comprising vanadium and phosphorous in the form of a cylinder having four internal holes. The axes of the internal holes are located equidistantly on a circle concentric to the circumference of the cylinder.

DE 692 20 225 T2 describes catalysts in the form of trilobes having 3 through-passages, in particular for preparing formaldehyde. The catalysts are obtained in the examples by tableting and have a defined length. A high actual surface area per unit volume and a low pressure drop are mentioned as advantageous properties.

DE 696 35 919 T2 describes catalysts in the form of trilobes having through-passages, in particular for preparing formaldehyde, which can be produced by extrusion or tableting. In the examples, the catalysts are produced by tableting and have a defined length.

US 2009/0306410 A1 describes catalysts in the form of trilobes having 3 through-passages, in particular for preparing maleic anhydride. The catalysts are obtained by tableting in the examples and have a defined length. A high actual surface area per unit volume and a low pressure drop are mentioned as advantageous properties.

EP 417 722 A1 describes catalysts for preparing unsaturated aldehydes. Shaped bodies having 3 or 4 through-passages are shown as examples in FIG. 1. In Example 4, shaped bodies having 3 through-passages are obtained by extrusion and are cut to a length of 5 mm. A geometric surface area per unit volume and the pressure drop are indicated for the shaped bodies.

WO 2016/156042 discloses shaped catalyst bodies for the oxidation of $SO_2$ to $SO_3$ in the form of tetralobes having four through-passages. The shaped bodies have a 27% higher specific surface and only a 15% higher pressure drop compared to shaped bodies having a star extrudate shape. Compared to corresponding trilobes having three through-passages, the tetralobes have a significantly lower pressure drop. The cutting hardness is higher, and the abrasion is lower than in the case of star extrudates.

The shaped catalyst bodies are produced by extrusion of suitable precursor compositions through an appropriate extrusion tool, drying and calcination of the extrudates. A high lateral compressive strength of the still-moist, freshly extruded shaped bodies and also of the dried and calcined shaped bodies is important for the production operation.

It is an object of the invention to provide shaped catalyst bodies, in particular for the oxidation of $SO_2$ to $SO_3$, which display a very large volume-based geometric surface area at very low pressure drop. Furthermore, the shaped catalyst bodies should have a very high lateral compressive state both in the moist, freshly extruded and in the dried and calcinated state.

The object is achieved by a shaped catalyst body in the form of a tetralobe having four circular through-passages, with the midpoints of the through-passages forming a square, wherein the spacings between two adjacent through-passages are from 0.8 to 1.2 times the thickness of the outer wall of the through-passages.

It has been found that the shaped catalyst bodies of the invention have, especially in the moist, freshly extruded state, a considerably higher lateral compressive strength than shaped catalyst bodies in the form of tetralobes in which the spacings between adjacent through-passages are smaller than the thickness of the outer walls of the through-passages.

Tetralobes are shaped bodies which have the shape of a four-leaf clover. As such shaped bodies can also be described as cylinders having 4 hollow-cylindrical convexities. This has a cross section which can be imagined as being formed by four partly overlapping annular rings whose midpoints lie essentially on a circular line having a diameter y, with the four annular rings being bounded by an outer circular line having an outer diameter x1 and an inner circular line having an inner diameter x2. Two adjacent through-passages in each case form a side of the square on which the midpoints of the through-passages are located. The spacing between adjacent through-passages is the minimal spacing of the circular lines banding them.

The outer and inner circular lines bounding the annular rings, and thus the through-passages of the hollow-cylindrical convexities of the shaped catalyst bodies, are preferably arranged concentrically. However, this is not absolutely necessary. The circles and thus the through-passages of the hollow-cylindrical convexities can also be arranged eccentrically. The thickness of the outer walls is, if this varies slightly in the case of an eccentric arrangement of the through-passages, defined as the minimum thickness of the outer walls. Preference is given to the concentric arrangement of the through-passages. The through-passages preferably have the same diameter. The spacings between the through-passages are therefore also preferably identical.

The invention is illustrated with reference to FIGS. 1 to 7.

Figure 5:
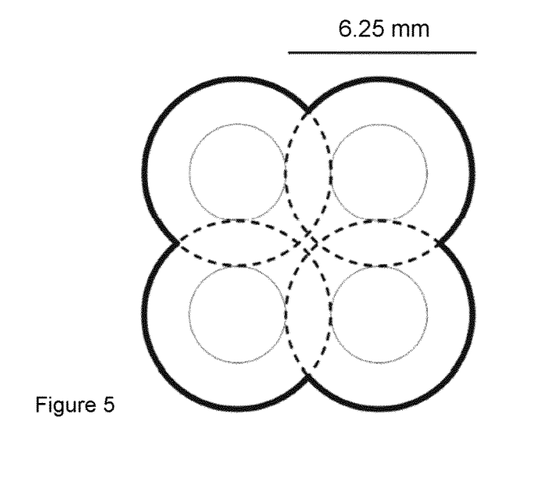
FIG. 5 shows a geometric construction of the cross section of a shaped body according to the invention from annular rings formed by inner circles and outer circles.

According to the invention, the wall thickness B of the outer walls of the through-passages is essentially equal to the spacing E between two adjacent through-passages, i.e. the wall thickness B is from 0.8 to 1, 2 times the spacing E. The wall thickness is preferably from 0.9 to 1.1 times the spacing, particularly preferably from 0.95 to 1.05 times the spacing. If the cross section of the shaped catalyst bodies is, as depicted in FIG. 5, thought of as being formed by four annular rings each bound by an outer circular line having an outer diameter x1 and a concentric inner circular line having an inner diameter x2, then (x1−x2)/2 is the outer wall thickness of the through-passages and equal to the spacing between in each case two adjacent through-passages. In the concentric case depicted in FIG. 5, an outer circular line and the respectively adjacent inner circular lines touch. When the outer circular lines touch (not shown), then A=B=E=⅕C.

In general, the ratio of the diagonal diameter D of the shaped body to the height of the shaped body F is from 0.25 to 2.0, preferably from 0.25 to 1.0 and particularly preferably from 0.4 to 0.75. The diagonal diameter D is the straight line which runs through the midpoints of diagonally opposite, i.e. non adjacent, through-passages. In general, the diagonal diameter D of the shaped body is from 5 to 80 mm, preferably from 10 to 20 mm and particularly preferably from 10 to 15 mm.

The shaped catalyst bodies of the invention can be produced by extrusion of a corresponding catalyst precursor composition comprising vanadium, at least one alkali metal and sulfate on a silicon dioxide support material through an extrusion tool which represents the geometry of the cross section of the shaped body, drying and calcination of the extruded shaped catalyst precursor bodies. The cross section of the opening of the extrusion tool accordingly has an ideal geometry which by 4 partly overlapping annular rings which are bounded by an outer circle having an external diameter x1 and an inner circle having an internal diameter x2 and whose midpoints lie on a circular line having the diameter y.

The ideal shape of the shaped bodies of the invention is defined by the geometry of the extrusion tool through which the catalyst precursor composition is extruded. In general, the geometry of actual extruded shaped bodies deviates from this ideal shape, but the actual shaped bodies have essentially the above-described geometric features. In general, the axes of the hollow-cylindrical convexities are parallel. However, the actual shaped bodies can, for example, be slightly curved in the z direction. The holes (through-passages) of the shaped bodies of the invention can deviate from a perfect circular shape. If a large number of actual shaped bodies is present, individual through-passages in some few shaped bodies can be closed. In general, the end face of the shaped bodies in the xy plane is, due to the production process, not a smooth surface but more or less irregular. The length of the shaped bodies in the z direction (maximum extension in the z direction) is generally not equal for all shaped bodies but instead has a distribution which is characterized by an average length z (arithmetic mean).

The process for producing shaped catalyst bodies comprising vanadium, at least one alkali metal and sulfate on a silicate support material includes the extrusion of a catalyst precursor composition comprising vanadium, at least one alkali metal and sulfate on a silicate support material through the opening of an extrusion tool the cross section of which represents the shaped catalyst body geometry, wherein the cross section of the opening of the extrusion tool is formed by 4 partly overlapping annular rings which are bounded by an outer circle having an external diameter x1 and an inner circle having an internal diameter x2 and whose midpoints lie on a circular line having the diameter y. In general, the catalysts comprise not only vanadium but also alkali metal compounds, especially potassium compounds but optionally also sodium compounds and/or cesium compounds, and also sulfate. Porous oxides such as silicon dioxide, $SiO_2$, are used as support for the abovementioned components.

As inert support materials, use is made of, in particular, porous materials based on $SiO_2$. Here, it is possible to use synthetic variants of $SiO_2$ and also natural forms of $SiO_2$ or mixtures thereof.

The content of vanadium, calculated as $V_2O_5$, is generally from 3 to 10% by weight, the content of alkali metals (M), calculated as $M_2O$, is from 5 to 30% by weight, with the molar ratio of alkali metal to vanadium (MN ratio) usually being in the range from 2 to 6. The content of potassium, calculated as $K_2O$, is usually in the range from 6 to 15% by weight and the content of sulfate is in the range from 12 to 30% by weight. In addition, it is possible for further elements such as chromium, iron, aluminum, phosphorus, manganese and boron to be comprised.

A preferred support material comprises naturally occurring diatomaceous earth. The support material particularly preferably comprises at least two different naturally occurring, uncalcined diatomaceous earths which differ in terms of the structure type of the diatoms on which they are based, with the various structure types being selected from plate-shaped, cylindrical and rod-shaped structure types.

The catalysts produced therefrom have a particularly good mechanical stability.

Preferred diatomaceous earths should have a content of aluminum oxide $Al_2O_3$ of less than 5% by weight, preferably less than 2.6% by weight and in particular less than 2.2% by weight. Their content of iron(III) oxide $Fe_2O_3$ should be less than 2% by weight, preferably less than 1.5% by weight and in particular less than 1.2% by weight. Their total content of alkaline earth metal oxides (magnesium oxide MgO+calcium oxide CaO) should be less than 1.8% by weight, preferably less than 1.4% by weight and in particular less than 1.0% by weight.

Uncalcined diatomaceous earth has not been treated at temperatures above 500° C., preferably not above 400° C. and in particular not above 320° C., before mixing with the active components. A characteristic feature of uncalcined diatomaceous earth is that the material is essentially amorphous, i.e. the content of cristobalite is <5% by weight, preferably <2% by weight and particularly preferably <1% by weight, determined by X-ray diffraction analysis.

Of course, the naturally occurring, uncalcined diatomaceous earth can have been subjected to various treatment steps apart from calcination, for example slurrying, washing, extraction, drying and/or sifting, after mining and before use as support material.

The production of the catalysts is effected by mixing aqueous solutions or suspensions of the various active components, for example appropriate vanadium compounds ($V_2O_5$, ammonium polyvanadate, ammonium metavanadate, alkali metal vanadates or vanadyl sulfates) with alkali metal salts (nitrates, carbonates, oxides, hydroxides, sulfates), optionally with sulfuric acid and other components which can function as pore formers or lubricants, for example sulfur, starch or graphite, with the support material. The mixing operation is not restricted further and can, for example, be carried out in a kneader, a screw mixer, a paddle mixer or a "Mix Muller" in which the components are mixed by means of rotating wheels and scrapers.

The resulting composition is, in the next step, extruded to give the shaped bodies according to the invention, dried and calcined. The type of extruder is not restricted further here. It is possible to use, for example, ram extruders, screw extruders, cascade extruders or planetary gear extruders. Preference is given to using screw extruders, in particular screw extruders having one or two screw shafts. The screw shafts can be optimized in respect of their geometry, for example in respect of their nominal diameter, the flight depth and/or the pitch, so that they produce very uniform extrudates. The material of the screw shaft or its surface and also the material of the barrel or its surface and of the extrusion tool or its surface can, for example, be optimized so that it has a very high resistance to the composition to be extruded. Owing to the low pH of the composition, corrosion- and acid-resistant materials are particularly preferred. The materials to be processed can be continuously or discontinuously supplied to the screw from above via a hopper. Reproducible metering and fill height in the hopper can lead to improved quality of extrusion.

The type of extrusion is likewise not restricted further. For example, cold extrusion, warm extrusion or hot extrusion can be used. At the inlet into the extruder, the composition to be extruded typically has a temperature of from 10 to 90° C. The extruder housing with the barrel can be cooled by means of a cooling medium, for example water, in order to prevent components from being deformed by excessively high temperatures. In such a case, the temperature of the cooling medium fed to the extruder is typically from 0 to 80° C. The temperature of the extrudate immediately after leaving the extruder is typically from 10 to 90° C. The speed of rotation of the screw is typically from 1 to 100 revolutions per minute, often from 2 to 30 revolutions per minute. The pressure in the extruder upstream of the extrusion tool is typically from 20 to 500 bar. The torque imparted by the screw is typically from 50 to 5000 Nm.

Extrusion tools can consist of one or more components. In a preferred embodiment, they consist of a die and insert pins, with the die as far as possible determining the shape, size and position of the outer convexities and the insert pins determining the shape, size and position of the four outer through-passages and of the central through-passage. The insert pins can be inserted into the die. The translatory and rotary centering of the insert pins in the dies can be achieved by means of a suitable construction of die and insert pins, for example by means of a groove in one component and a tongue in the other component. Centering can also be effected with the aid of an additional centering tool.

If the extrusion tool consists of a plurality of components, the components can consist of the same material or of different materials. In a preferred embodiment, the die consists of a very acid-resistant plastic, for example PTFE and the insert pins consist of an acid-resistant stainless steel. The dies can be produced inexpensively by, for example, injection molding.

The shaped bodies are generally subjected to a drying step after extrusion. Here, the type of oven is not restricted further. It is possible to use, for example, stationary convection ovens, rotary tube ovens or belt ovens. The duration of drying is generally from 0.5 to 20 hours and the temperature is generally from 50 to 200° C.

The shaped bodies are generally subjected to a calcination step after drying. Here, the type of oven is not restricted further. It is possible to use, for example, stationary convection ovens, rotary tube ovens or belt ovens. The duration of the calcination is generally from 0.5 to 20 hours and the temperature is generally from 200 to 800° C.

After the calcination or even at other points during the process for producing the catalyst, it can be advantageous to sort the shaped bodies according to their dimensions and utilize only a suitable size fraction. Such sorting can be effected, for example, by means of suitable sieves. Shaped bodies which are larger or smaller than the desired dimensions can, for example, be recirculated as recycle material to suitable points in the process. It can be advantageous to subject this recycle material to one or more further process steps, for example milling, before recirculation.

The present invention also provides for the use of the shaped catalyst bodies for the oxidation of $SO_2$ to $SO_3$.

The present invention further provides a process for the oxidation of $SO_2$ to $SO_3$, wherein a gas mixture comprising oxygen and sulfur dioxide is brought into contact at a temperature in the range from 340 to 680° C. with a bed of the shaped catalyst bodies of the invention.

Tray reactors (see, for example, "H. Müller, Sulfuric Acid and Sulfur Trioxide in Ullmann's Encyclopedia of Industrial Chemistry, Wiley-VCH, 2012"; DOI: 10.1002/14356007.a25_635) are typically used as reactors. These tray reactors have a plurality of reaction trays in which $SO_2$ is brought into contact with shaped catalyst bodies. The reactor typically comprises from 1 to 6, usually from 3 to 5, trays. The tray reactors generally behave approximately adiabatically, i.e. the heat liberated in the oxidation of $SO_2$ to $SO_3$ largely heats the reaction gas. The exothermic oxidation of $SO_2$ to $SO_3$ is limited by thermodynamic equilibrium which is shifted in the direction of the starting materials with increasing temperature. After passage through a tray, the reaction gas is therefore cooled, for example in suitable heat exchangers, before being fed to the next tray. Furthermore, there are processes in which the $SO_3$ formed is largely removed from the reaction gas, for example by absorption in concentrated sulfuric acid, between two trays in order to increase the conversion of remaining $SO_2$ in the subsequent trays.

The concentration of $SO_2$ in the reaction gas before the latter enters the first tray is generally from 2 to 20% by volume; depending on $SO_2$ source, it is typically in the range from 5 to 15% by volume. The concentration of $O2$ in the reaction gas before the latter enters the first tray is likewise generally 2-20% by volume; depending on $SO_2$ source, it is typically in the range from 5 to 15% by volume. The volume flows are generally from 10 000 to 500 000 standard m³/h, typically from 30 000 to 350 000 standard m³/h. The diameter of the reactors is typically from 2 to 15 m, normally from 3 to 10 m. The volume of the catalytic bed per tray is generally from 10 to 500 m³, usually from 20 to 350 m³. The height of the catalytic bed per tray is generally from 0.3 to 3 m, typically from 0.5 to 2.5 m. The space velocity of gas in standard m³/h, based on the catalyst volume in m³ (GHSV), is generally from 100 to 5000 h$^{-1}$, usually from 500 to 2500 h$^{-1}$. The flow is typically in the laminar range, and the Reynolds number of the flow in the tray is generally from 10 to 1000, typically from 30 to 500. The pressure drop over the bed in a tray is generally from 2 to 100 mbar, typically from 5 to 50 mbar.

It is economically advantageous for the pressure drop over the process, in particular over reactor, heat exchanger and optionally absorption tower, to be low in order to have low costs for compression of the reaction gas and in order to minimize the pressure rating requirements for the components. A catalytic bed which displays a low pressure drop and a high activity is advantageous here.

The invention is illustrated in more detail by the following examples.

EXAMPLES

Example 1

Production of the Catalyst Composition 0.8991 kg (30% by weight based on the mixture of the diatomaceous earths) of a diatomaceous earth of the type MN from EP Minerals, 1.4985 kg (50% by weight based on the mixture of the diatomaceous earths) of a diatomaceous earth of the type Masis from Diatomite SP CJSC and 0.5994 kg (20% by weight based on the mixture of diatomaceous earths) of a diatomaceous earth of the type Diatomite 1 from Mineral Resources Ltd are mixed for 30 minutes at 45 revolutions per minute in a drum hoop mixer (from Engelsmann, container volume 32 liters). The mixture of the diatomaceous earths is placed in a Mix-Muller (from Simpson, year of construction 2007, container volume 30 liters) and processed for 2 minutes at 33 revolutions per minute. A first solution consisting of 1.3706 kg of aqueous KOH solution (47.7% by weight) and 0.532 kg of ammonium polyvanadate (from Treibacher) is then added over a period of 2 minutes and the mixture is processed further for 1 minute. 2.1025 kg of 48 percent strength sulfuric acid is added over a period of 2 minutes and the mixture is processed for a further minute at 33 revolutions per minute. As next step, 0.3 kg of $K_2SO_4$ (from K+S Kali GmbH) is introduced into 1.587 kg of a 50 percent strength aqueous $Cs_2SO_4$ solution, introduced over a period of 2 minutes into the Mix-Muller and processed for 1 further minute at 33 revolutions per minute and 180 g of a starch solution (7.39% by weight of potato starch in DI water) are then added while continuing to process. The composition obtained is processed further at 33 revolutions per minute until the total processing time from introduction of the diatomaceous earth is 15 minutes altogether.

Production of Shaped Catalyst Bodies

Example 2 (Comparative Example)

Figure 1:
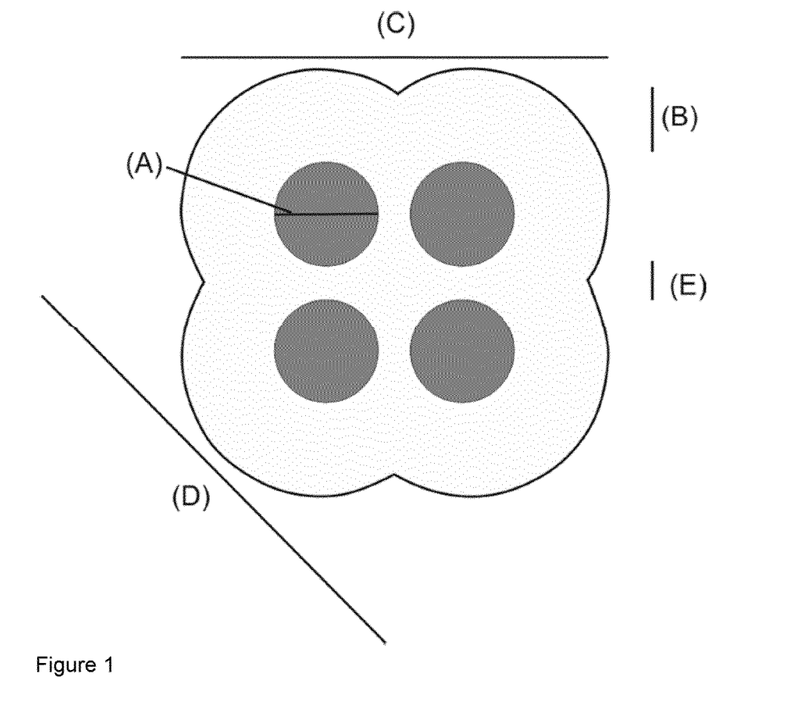
FIG. 1 shows the cross section of a shaped body having a lateral diameter C and a diagonal diameter D according to the prior art, as is described in WO 2016/156042. Here, the spacings E of two adjacent circular through-passages having the diameter A is smaller than the outer wall thicknesses B of the through-passages.
Figure 6:
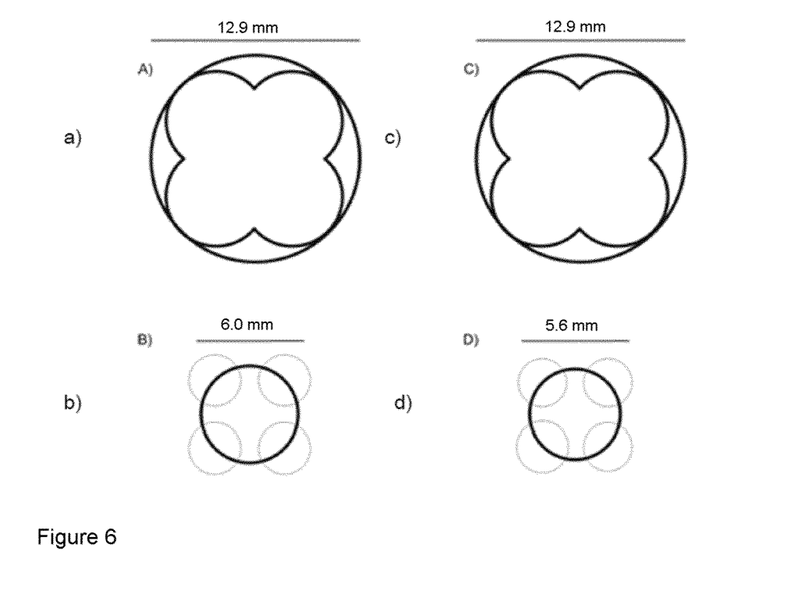
FIGS. 6a, 6b, 6c and 6d show horizontal projections of dies used for producing comparative shaped bodies according to the prior art.

The geometry of the shaped body is determined by a die through which the composition to be extruded is conveyed under high pressure. A die as per FIGS. 6c, 6d was used. The extruded shaped body has the geometry shown in FIG. 1, with the following dimensions:

A=3.2 mm
B=2.1 mm
C=11.5 mm
D=12.9 mm
E=0.95 mm
F=15-30 mm

A screw extruder with a screw is used here. The introduction of solids into the screw is effected from above. The extruder is cooled by means of water. The rotation speed of the transport screw in the extruder is 10 revolutions per minute. The temperature of the solid on introduction and of the shaped bodies on leaving the extruder is about 50° C. The throughput through one extruder is 6000 kg per day. Since, inter alia, the speed of transport of the extrudates is not constant, a uniform length is not obtained but instead a length distribution is obtained. Furthermore, the average length is dependent on the geometry of the die. The shaped bodies are subsequently dried at 120° C. for 2 hours and calcined at 475° C. for 3 hours. Oversize and undersize shaped bodies are removed by means of screening devices.

The lateral compressive strength was determined in accordance with DIN/ISO on the extruded shaped body, both for the still-moist shaped body immediately after extrusion on the still-moist shaped body and also after calcination. This was after extrusion: 1.9 N (corresponds to 100%)
after calcination: 110 N (corresponds to 100%)

Example 3 (According to the Invention)

Figure 2:
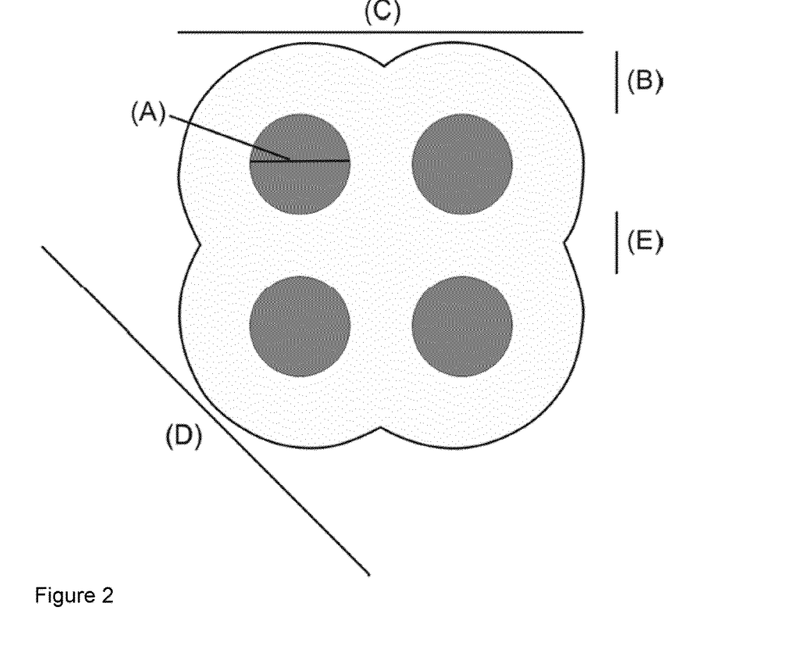
FIG. 2 shows the cross section of a shaped body according to the invention having a lateral diameter C and a diagonal diameter D. Here, the spacings E of in each case two adjacent circular through-passages having the diameter A are essentially the same as the outer wall thicknesses B of the through-passages.
Figure 3:
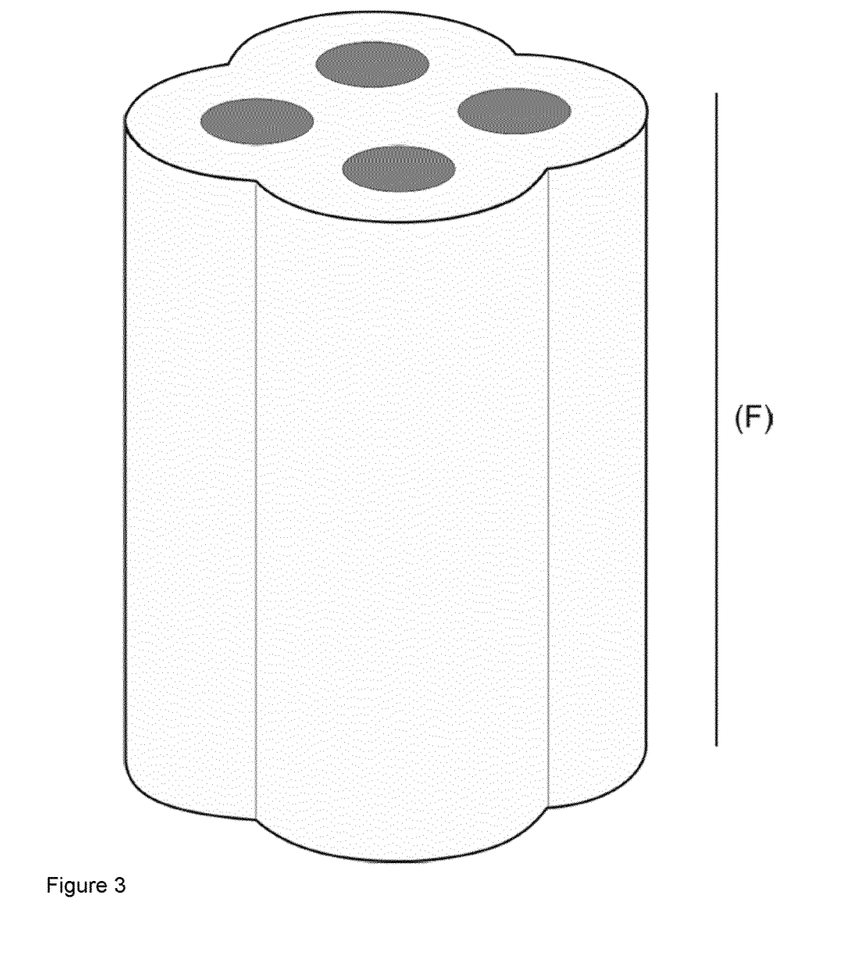
FIG. 3 shows a perspective view of a shaped body according to the invention having the height F.
Figure 4:
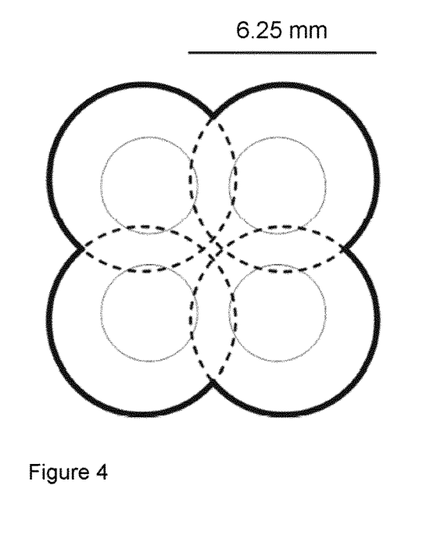
FIG. 4 shows a geometric construction of the cross section of a shaped body according to the prior art from annular rings formed by inner circles and outer circles.
Figure 7:
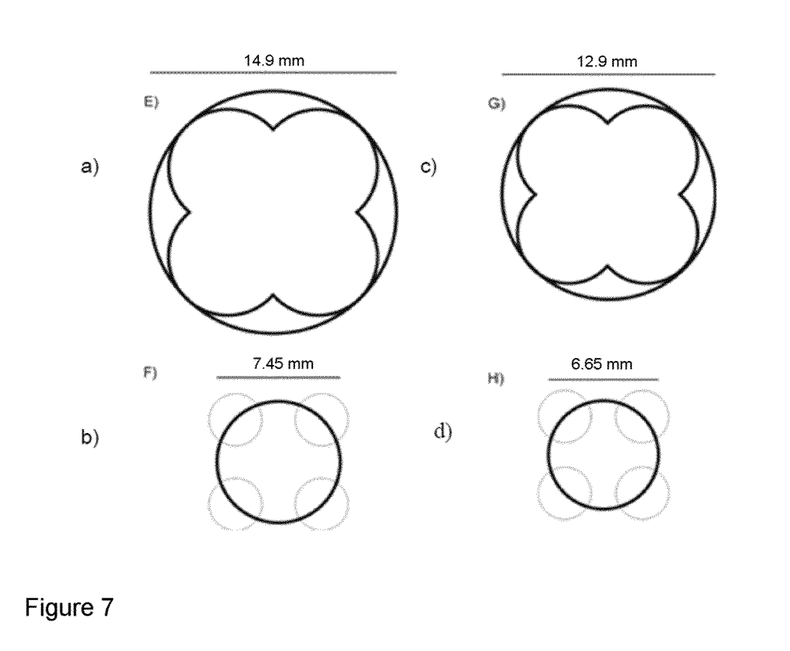
FIGS. 7a, 7b, 7c and 7d show horizontal projections of dies used for producing shaped bodies according to the invention.

Example 2 was repeated. A die as per FIGS. 7a, 7b was used. The extruded shaped bodies have the geometry shown in FIG. 2, with the following dimensions:

A=3.2 mm
B=2.0 mm
C=13.0 mm
D=14.9 mm
E=2.0 mm
F=15-30 mm

The lateral compressive strength was likewise determined on the extruded shaped body both for the still-moist shaped body immediately after extrusion on the still-moist shaped body and also after calcination. This was after extrusion: 5.6 N (corresponds to 295%)
after calcination: 220 N (corresponds to 200%)

The invention claimed is:

1. A shaped catalyst body in the form of a tetralobe having exactly four circular through-passages, with the midpoints of the through-passages forming a square, wherein the spacings E of in each case two adjacent through-passages are from 0.9 to 1.1 times the thickness B of the outer walls of the through-passages, and wherein the cross section of the tetralobe is formed by four partly overlapping annular rings whose midpoints lie on a circular line having a diameter y, with the four annular rings being bounded by an outer circular line having an outer diameter x1 and a concentric inner circular line having an inner diameter x2.

2. The shaped catalyst body according to claim 1, wherein the ratio of the diagonal diameter D of the shaped body to the height F of the shaped body is from 0.25 to 2.0.

3. The shaped catalyst body according to claim 2, wherein the ratio of the diagonal diameter D of the shaped body to the height F of the shaped body is from 0.25 to 1.0.

4. The shaped catalyst body according to claim 1, wherein the diagonal diameter D of the shaped body is from 5 to 80 mm.

5. The shaped catalyst body according to claim 4, wherein the diagonal diameter D of the shaped body is from 10 to 20 mm.

6. The shaped catalyst body according to claim 1, wherein the body comprises vanadium, at least one alkaline metal and sulfate on a silicate support material.

7. The shaped catalyst body according to claim 5, wherein the body comprises vanadium, at least one alkaline metal and sulfate on a silicate support material.

8. The shaped catalyst body according to claim 1 obtainable by extrusion of a catalyst precursor composition through an extrusion tool which represents the geometry of the cross section of the shaped catalyst body to form shaped catalyst precursor bodies, drying and calcination thereof.

9. A process for the oxidation of $SO_2$ to $SO_3$, which comprises bringing into contact a gas mixture comprising oxygen and sulfur dioxide at a temperature in the range from 340 to 680° C. with a bed of shaped catalyst bodies according to claim 1.

* * * * *